Jan. 14, 1969        N. S. RUBIN        3,422,398

VEHICLE SOLID STATE ALARM SYSTEM

Filed March 8, 1966        Sheet _1_ of 2

INVENTOR

*Norman S. Rubin*

BY *Polachek & Saulsbury*

ATTORNEYS

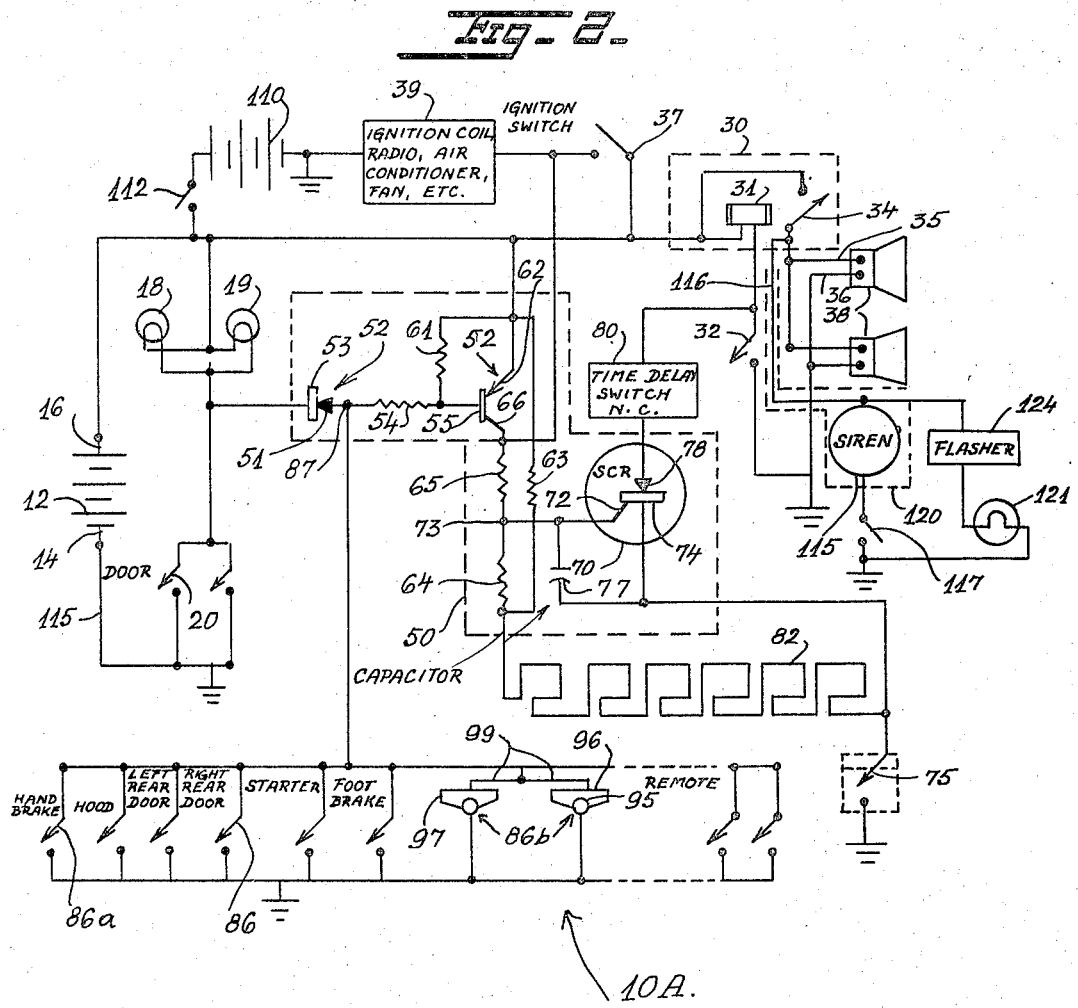

United States Patent Office 3,422,398
Patented Jan. 14, 1969

3,422,398
VEHICLE SOLID STATE ALARM SYSTEM
Norman S. Rubin, Bronx, N.Y.
(66 Dawn Drive, Churchville, Pa. 18966)
Filed Mar. 8, 1966, Ser. No. 532,600
U.S. Cl. 340—63                                10 Claims
Int. Cl. G08b 13/00; B60r 25/00

This invention concerns an improved alarm system intended to provide an audible signal in the event unauthorized disturbance or entry of a vehicle is attempted. The invention more particularly concerns such an alarm system employing a solid state trigger circuit having semiconductor components.

By employing a solid-state trigger circuit, use of alarm actuating relays having moving parts, such as heretofore known in the art, is avoided. When electromagnetic relays are employed, the possibility always exists that moving armatures will stick, relay contacts will fail to open or close or will make poor contact, relay coils will burn out, etc. By avoiding such relays, and using solid state semiconductor components instead, greater reliability in performance is achieved, the trigger circuit provided is smaller and more compact than is possible with a conventional relay circuit, and concealment of the essential parts of the circuit is more readily accomplished. The trigger circuit can be constructed compactly so that it occupies only a few cubic inches. The system employs many of the components such as switches currently used in automobiles and trucks. This effects considerable economy.

It is possible to arrange the system using the basic solid state trigger circuit so that any unusual disturbance of a vehicle will set off the alarm. Such disturbance may involve an attempt to jack up one end of a vehicle for the purpose of stealing a tire or wheel or for the purpose of towing the vehicle away. It may involve an attempt to tow away the vehicle without jacking it up or opening any doors. It may even involve a collision by some other vehicle with a parked vehicle equipped with the present alarm system. In any case the invention will serve to set off an alarm to frustrate theft of a vehicle or its contents.

The system may be provided with reserve emergency operating components so that an attempt to disconnect or cut the main power cable from the battery of the vehicle will not silence the alarm; neither will cutting the wires at the horns of the vehicle.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIGS. 1 and 2 are diagrams of two alarm systems embodying the invention.

FIG. 3 is central longitudinal vertical sectional view of a gravity-inertia switch which may be employed in the system of FIG. 2.

FIG. 4 is a central transverse vertical sectional view taken on line 4—4 of FIG. 3.

Referring first to FIG. 1 there is shown alarm system 10 in which battery 12 is the battery generally provided in an automobile or truck for energizing the vehicle's electrical system. One terminal 14 of the battery is grounded to the chassis or frame of the vehicle. Connected to the other terminal 16 of the battery is a dome lamp 18 which in turn is connected in series with parallel connected side door interlock switches 20. A courtesy lamp 19 located under the dashboard may also be provided and connected to switches 20. There are two horns 28 connected in parallel to horn relay 30. The horn relay has a coil 31 connected at one end 27 to battery terminal 16, and at the other end 29, coil 31 is connected to normally open horn switch 32 which is in turn connected to ground. The relay has normally open contacts 33, 34. Contact 33 is connected to battery terminal 16. Contact 34 is connected to one terminal 35 of each horn. The other terminal 36 of each horn is grounded. Ignition switch 37 is connected between terminal 16 and ground via ignition coil and accessories 39. To the extent described, the alarm system employs conventional components generally provided in the electrical system of most mass produced vehicles having internal combustion engines.

Now according to the invention, there is provided trigger circuit 50 which includes a semiconductor diode rectifier 52 having its cathode 53 connected to junction point 49 between lamps 18, 19 and switches 20, 22. The anode 51 of the rectifier is connected via resistor 54 to base 55 of a transistor 60. Resistor 61 is connected between base 55 and emitter 62. The emitter is connected to battery terminal 16. The emitter is also connected via series resistors 63, 64 and 65 to the collector 66 of the transistor.

The trigger circuit 50 also includes a semiconductor silicon gate controlled rectifier 70. This rectifier has a control gate 72 connected to junction point 73 between resistors 64 and 65. The cathode 74 of the rectifier is connected to a normally open key operated lockswitch 75. The switch has a grounded terminal 76. Capacitor 77 is connected between control gate 72 and cathode 74. Anode 78 of the rectifier is connected via a normally closed time delay switch 80 to end 29 of the horn relay coil 31. Connected between lockswitch 75 and the junction point 81 between resistors 63 and 64 is a series arrangement of foil loops 82. These loops are respectively applied to different windows of the vehicle and are arranged so that unauthorized opening of any window or breaking of any window to gain entry to the vehicle will open or rupture the foil loop thereon. The key operated lockswitch 75 may be located inside or outside of the vehicle in an obscure concealed location. Terminal 83 of ignition switch 37 is connected to junction point 85 between collector 66 and resistor 65. A plurality of parallel connected switches 86 are connected between junction point 87 and ground. Junction point 87 is located between anode 51 and resistor 54.

The transistor 60 is normally nonconducting. Resistor 65 provides a current path from collector 66 to the control gate 72 of rectifier 70. Resistor 54 provides a current path from the base 55 of the transistor to ground through diode 52 and switches 20 or through switches 86. Switches 86 are interlock switches respectively located at strategic points of the vehicle where an unauthorized person may attempt to gain entry to the vehicle, such as the trunk, hood, left and right rear doors, etc. An interlock switch may be located at the starter of the vehicle. Other interlock switches 86 may be located at other desired remote points, such as a storage locker for goods in a truck, foot brake, backup lights, directional signals, etc.

The system is alerted for triggering the alarm system in which horns 28 provide the audible alarm, by closing switch 75. This connects cathode 74 of the gated rectifier 70 to ground, which is the chassis, frame and body of the vehicle. Switch 75 is preferably key operated and is located in an obscure concealed location. The key will be removed after the switch is closed so that an authorized person cannot immediately find and open the switch. All switches 20 and 86 will be open, because all doors, trunk and hood, are closed; the foot brake and starter are deactivated. Transistor 60 will be nonconducting and no current will flow through resistor 65 to control gate 72.

Suppose now an unauthorized person tries to enter the vehicle by opening any door, or to disturb the vehicle by opening the hood or trunk. One of the switches 20 or 86 will close and provide a current path through resistor 54 to ground. Transistor 60 will become conducting and a voltage will be applied at control gate 72. This voltage will exceed the predetermined breakover voltage of the rectifier 78 and the normally nonconducting rectifier will be rendered conductive. The rectifier 70 will pass a current through the horn relay coil 31 and the horns 28 will sound off continuously. The silicon gate controlled rectifier remains locked in its conductive condition and cannot be turned off even though thereafter the voltage applied to control gate 72 is cut off. Thus even though the unauthorized person closes the door, trunk or hood where the system was triggered, the alarm will continue to sound.

The time delay switch 80 may have a predetermined operating time such as five minutes or more which will generally be sufficient to frighten off the unauthorized intruder. Then the alarm will automatically go off as the time delay switch opens and stays open until reclosed by the authorized operator of the vehicle. If the time delay switch is omitted, then the alarm can only be shut off by opening switch 75. This can only be done by an authorized operator of the vehicle.

If the intruder should somehow enter the vehicle such as through the roof of a truck or soft top convertible automobile, he may avoid actuating the door switches, but operation of the starter of the vehicle will set off the alarm. If the intruder short circuits the ignition switch 37 by a jumper wire or closes the switch 37 by using a skeleton key, the rectifier 70 will be triggered on via resistor 65 and the alarm will sound. If an intruder should break or open a window to open the foil circuit 82 after the switch 75 is closed, a current will flow through resistors 63 and 64 to apply sufficient voltage to gate 72 to trigger on the rectifier 70 and sound the alarm.

Resistors 61 and 64 provide leakage current paths for the transistor 60 and rectifier 70 respectively, when the system is armed by closing switch 75 but not triggered on. The diode rectifier 52 serves as the additional function of preventing lamps 18, 19 from lighting when any of the remotely located switches 86 are operated at the trunk, hood, etc., while the switch 75 is open to deactivate the system. The system will operate in any vehicle having a negative ground system and a battery voltage of at least three volts, which is generally sufficient to energize the transistor 60 and silicon gate controlled rectifier 70.

Capacitor 77 connected between the control gate 72 and cathode 74 reduces the possibility of accidental triggering of the system due to any one of a number of reasons, such as accumulated electrostatic charge during a storm, or due to contact of the armed vehicle by a second vehicle having an electrostatic charge of different polarity from the armed vehicle.

FIG. 2 shows alarm system 10A which is intended for installation in larger, more luxurious vehicles, commercial vehicles, trucks and the like, where a more elaborate system of greater capabilities may be desired. System 10A is generally similar to system 10 and corresponding parts are identically numbered and perform the same functions described above. The trigger circuit 50 employing solid state semiconductor components is identical in both systems.

It will be noted that system 10 involves parts of the vehicle which are already conventionally associated with the electrical system of mass produced vehicles such as interlock switches at doors, hood, trunk, foot brake, etc. There are a number of other parts of the vehicle to which alarm protection may be extended. For example, the interlock switch 86a may be provided at the hand brake of the vehicle. This will serve the purpose of setting off the alarm 28 in the event that an intruder somehow gains entry to the vehicle without triggering the alarm system, and who releases the hand brake for the purpose of towing the vehicle away without starting the motor of the vehicle.

It sometimes happens also that a thief attempts to jack up one end of a vehicle for the purpose of stealing the wheels. This is forestalled by providing gravity-inertia switches 86b at both sides of the vehicle under the body located at about the transverse central line of the vehicle.

FIGS. 3 and 4 illustrate a suitable type of gravity-inertia switch. The switch 86b has a plastic nonconductive hollow base 90 closed by a plastic cover 91 secured by screws 92. A metal bracket 93 is joined to the body B of the vehicle by screws 89. Inside the base 90 is a metal bar or plate 94 having a central point P which is lower than points P' at opposite ends. Upper side portions S of plate 94 incline down from points P' to point P. A metal ball 95 is normally held gravitationally at the lower point P. This ball will roll along either one of inclined surfaces S to either end of the base if the switch is tilted angularly out of the horizontal plane H of the vehicle indicated in FIG. 3. Seated in base 90 is an inverted generally rectangular U-shaped metal contact member 96 having depending vertical legs 97 at opposite ends of the switch. The legs are joined by straight bight 98 to which a wire 99 is connected via a screw 100 extending through a hole in cover 91 and seated in bight 98. Screws 102 secure plate 94 in the case 90 and hold the base to the bracket 93. Thus the ball 95 is grounded through the plate 94 and bracket 93 to the body of the vehicle. The wires 99 of both switches 86b are connected together to junction point 87 of the trigger circuit 50.

It will be apparent that if an unauthorized person attempts to jack up either end of the vehicle for the purpose of stealing a wheel, or even for the purpose of stealing the entire vehicle by towing it away, either one or both switches 86b will close. Ball 95 will roll along the inclined side portion S to contact a switch leg 97 whereupon the armed system will be triggered in the same way as previously described when a door is opened by an intruder.

If, while the vehicle equipped with system 10A is parked, the vehicle should be struck by another one, one or both of the jarred switches 86b will close momentarily. This will be sufficient to actuate the armed alarm system and the alarm will sound continuously. Also, if the vehicle is towed by a thief without jacking up the vehicle, the sudden movements of the vehicle will cause switches 86b to close.

Sometimes, a thief will open the hood of a vehicle and cut or disconnect the power supply cable of the battery to disable the alarm system and for the purpose of towing the vehicle away. This is forestalled in system 10A by providing an auxiliary battery 110 in a secret, concealed place, such as under a seat of the vehicle so that the alarm will continue to sound even though battery 12 is effectively taken out of the circuit. Battery 110 is connected in parallel with battery 12 and has its own switch 112 which is normally open. Switch 112 is closed only when switch 75 is closed to arm the system. Thus battery 110 is not active during normal operation of the vehicle and is only put into service when the alarm system 10A is armed.

Sometimes an intruder will tear wires 35, 36 loose from the horns 28 to silence them before or after the alarm is triggered. This is forestalled by providing an auxiliary siren 115 connected to the horn relay contact 34 via an armored cable 116. The siren may be enclosed in an armored screen or guard 120. Thus it cannot be silenced quickly, and will sound to warn of unauthorized activity at the vehicle. If desired siren 115 can be added to system 10 of FIG. 1 to supplement the conventional sound of the horn by a sound indicating an urgent emergency condition. Switch 117 is used to deactivate the siren under normal operation conditions of the vehicles. If desired a red lamp 121 and flasher 124 can be provided in parallel with the siren to provide a visual emergency signal to suppplement the sound of the siren.

System 10A provides protection against a greater range of possible intrusions and disturbances of the vehicle; but system 10 has the advantage of greater simplicity and less cost, and the range of protection it affords will generally be sufficient to guard the average vehicle against casual intruders. System 10A which is more elaborate will furnish protection against activities of more aggressive intruders and thieves.

Both systems can be installed in existing vehicles or can be installed in vehicles at the time of manufacture.

While I have illustrated and described the preferred embodiments of my invention, it is to be understood that I do not limit myself to the precise construction herein disclosed and that various changes and modifications may be made within the scope of the invention as defined in the appended claims.

What is claimed is:

1. An alarm system for a vehicle having a body with a plurality of movable closure members openable to the interior of said body, said system comprising in combination: a source of direct current; an electrically operable alarm device; a solid state gate controlled semiconductor triode rectifier having an anode, cathode and gating electrode; first circuit means connecting said current source, alarm device, anode and cathode in a first series circuit for activating said alarm device by current passing through the rectifier via the anode and cathode; said rectifier having a high internal electrical resistance so that the rectifier is normally in a nonconductive state unless a voltage of predetermined magnitude is applied at least momentarily between said gating electrode and cathode to reduce said electrical resistance to a low value, said low value of electrical resistance being then maintained so that electric current passes continuously through the rectifier between anode and cathode until the electric current is interrupted whereupon the high electrical resistance and nonconductive state of the rectifier are restored; a normally open switch arranged to be closed by an intruder entering the vehicle body; electrical resistance means, second circuit means connecting said direct current source, switch and resistance means in a second series circuit for establishing said voltage of predetermined magnitude across terminals of said resistance means when the switch is closed; and third circuit means connecting said cathode and gating electrode to the terminals respectively of said resistance means for applying said predetermined voltage between said gating electrode and cathode, whereby the rectifier is rendered conductive between the anode and cathode to activate the alarm device when said switch is closed, and whereby the solid state rectifier remains conductive and the alarm device remains activated even though the switch is thereafter opened.

2. An alarm system as recited in claim 1, further comprising a plurality of normally open interlock switches connected in parallel and respectively located at a certain of said closure members, said interlock switches being adapted to close respectively when their associated closure members are opened; a transistor having a base, emitter and collector, said transistor being maintained in a normal nonconductive state between said collector and emitter via said base unless a current of predetermined magnitude is passed at least momentarily through said emitter and base; second electrical resistance means; fourth circuit means connecting said current source, emitter, base second resistance means, and interlock switches in a third series circuit, whereby said current of predetermined magnitude passes through the transistor between the emitter and base when any one of the interlock switches is closed to render the transistor conductive between said emitter and collector; and fifth circuit means connecting said direct current source, emitter, base, collector and first named resistance means in a fourth series circuit so that said voltage of predetermined magnitude is established across terminals of the first resistance means when current passes through the fourth series circuit, whereby the solid state rectifier is triggered to conductivity and the alarm device is activated.

3. An alarm system as recited in claim 1, further comprising a normally open key operated switch connected in said first series circuit for keeping the alarm device deactivated even though the first named switch is closed, and time delay means in said first series circuit to stop operation of the alarm device in a predetermined time after the alarm device is activated.

4. An alarm system as recited in claim 2, further comprising a normally open key operated switch connected in said first series circuit for keeping the alarm device deactivated even though any one of the first named switch and the interlock switches is closed, and time delay means in said first circuit to stop operation of the alarm device in a predetermined time after the alarm device is activated.

5. An alarm system as recited in claim 1, further comprising a plurality of foil members connected in series with each other at others of said closure members, another electrical resistance means, other circuit means connecting said foil members, other electrical resistance means and said current source in another series circuit, said other electrical resistance means being further connected in circuit with the first named electrical resistance means, whereby current normally passing through the said other electrical resistance is normally shunted through the foil members, and whereby current passes through the first named and other electrical resistance means when circuit continuity between the foil members is interrupted by opening one of the other closure members to render the solid state rectifier conductive and to activate the alarm device.

6. An alarm system as recited in claim 2, wherein said alarm device comprises a siren, and an armored cable connecting the said siren in said first series circuit.

7. An alarm system as recited in claim 4, further comprising another direct current source connected in parallel with the first named direct current source to provide a reserve source of current in the event that the first named direct current source is rendered inactive.

8. An alarm system as recited in claim 4, further comprising a normally open gravity-inertia switch connected in parallel with the interlock switches, said gravity-inertia switch being oriented in such a position with respect to the body of the vehicle that any tilt of said body beyond a certain angle out of a horizontal plane and any force applied to said body beyond a certain magnitude of force closes the gravity-inertia switch and renders the transistor conductive to render said solid state rectifier conductive in turn for activating the alarm device.

9. An alarm system as recited in claim 2, wherein said vehicle has a mechanically operable brake settable in a locked position when the vehicle is parked, and another interlock switch connected in parallel with the first named interlock switches and located at said brake, said other interlock switch being normally open when the brake is set in locked position and being closed when brake is unlocked, whereby opening of said other interlock switch renders the transistor conductive to render the solid state rectifier conductive for activating the alarm device.

10. An alarm system as recited in claim 2, further comprising a plurality of foil members connected in series with each other at others of said closure members, another electrical resistance means, other circuit means connecting said foil members, other electrical resistance means and said current source in another series circuit, said other electrical resistance means being further connected in circuit with the first named electrical resistance means, whereby current normally passing through said other electrical resistance is normally shunted through the foil members, and whereby current passes through the first named and other electrical resistance means when circuit continuity between the foil members is interrupted by opening one of the other closure members to render the solid state rectifier conductive and to activate the alarm device.

No references cited.

JOHN W. CALDWELL, *Primary Examiner.*

ALVIN H. WARING, *Assistant Examiner.*

U.S. Cl. X.R.

307—10; 340—276